Nov. 24, 1936.  L. A. MARKS  2,061,974
EXPOSURE GAUGE
Filed Feb. 6, 1936  2 Sheets-Sheet 1

Inventor
Leland A. Marks
By Clarence A. O'Brien and
Hyman Berman  Attorneys

Nov. 24, 1936.  L. A. MARKS  2,061,974
EXPOSURE GAUGE
Filed Feb. 6, 1936   2 Sheets-Sheet 2

Inventor
Leland A. Marks

By *[signature]* and
*[signature]* Attorney

Patented Nov. 24, 1936

2,061,974

UNITED STATES PATENT OFFICE 2,061,974

EXPOSURE GAUGE

Leland A. Marks, Yreka, Calif.

Application February 6, 1936, Serial No. 62,690

1 Claim. (Cl. 95—10)

This invention appertains to new and useful improvements in the art of photography and more particularly to a novel gauge for determining the correct exposure to sunlight necessary for proper printing of tracings and drawings by sunlight.

The principal object of the invention is to provide a gauge of the character stated which is handy to manipulate and which will be accurate in determining how much time should be given to exposures where printing is being done during sunlight or cloudy days.

Other important objects and advantages of the invention will become apparent to the reader of the following specification.

Figure 2:
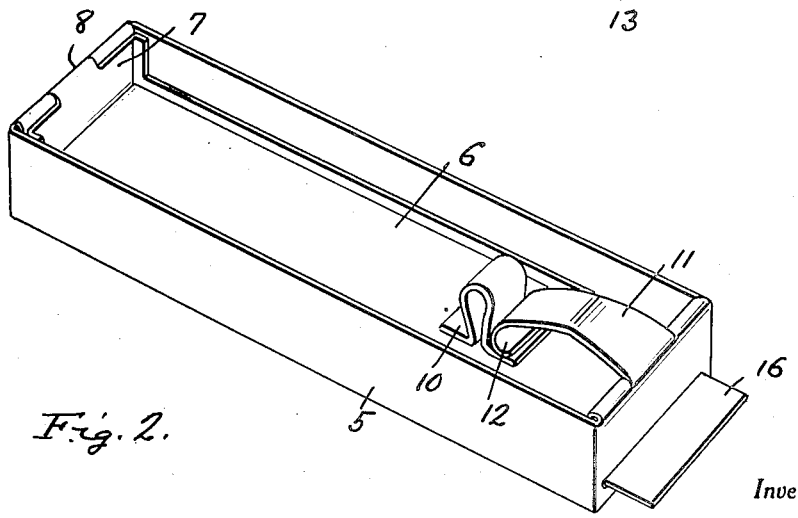
Figure 2 represents a perspective view of the case in closed position.

Referring to the drawings wherein like numerals designate like parts, it can be seen that the case consists of a rectangular shaped frame consisting of end walls and side walls, this case being denoted by numeral 5. A presser plate 6 is provided with a laterally disposed end wall 7 hingedly connected as at 8 to one end of the casing 5. An inverted U-shaped member 9 has its leg portions bent laterally and secured as at 10 to the outer side of the presser plate 6, and to hold this presser plate in closed position as shown in Figure 2, a swingable spring arm 11 is provided having a backwardly bent end portion 12 for engagement against the handle 9 in the manner substantially shown in Figure 2.

One end wall of the casing 5 is provided with a slot 13 therein and the open front of the casing is provided with an inturned flange 14 around its entire perimeter against which the glass 15 can bear.

Figure 1:
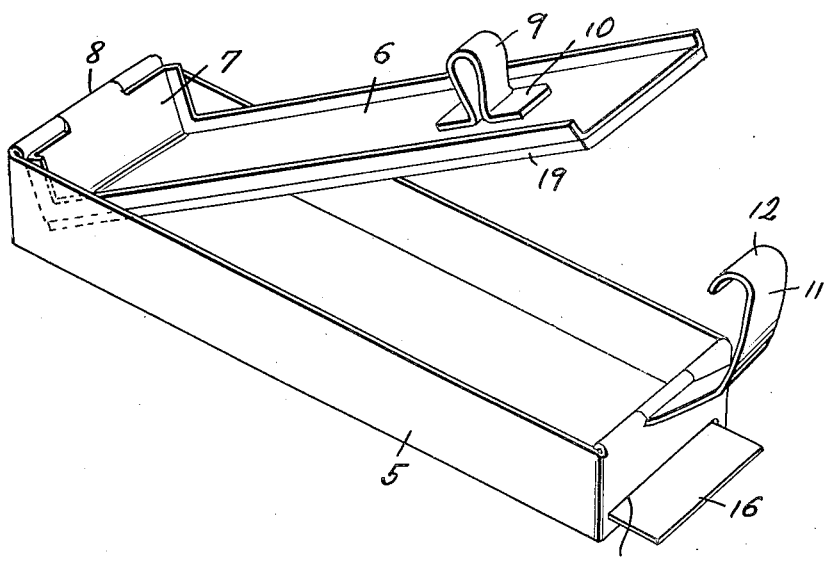
Figure 1 represents a perspective view of the case.

Slidably disposed through the slot 13 is the strip 16 of sensitized paper (see Figure 1) while between the strip 16 and the glass pane 15 is the transparent strip 17 with the dark line 18 extending longitudinally thereof. It is necessary that this line 18 be parallel to the sides of the frame 5. A strip of felt or some other similar material 19 is adhered to the inner side of the presser plate 6 and then presses against the strip 16.

Figure 3:
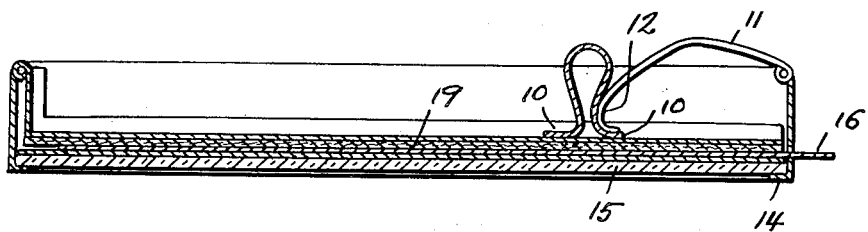
Figure 3 is a longitudinal sectional view through the case.
Figure 4:
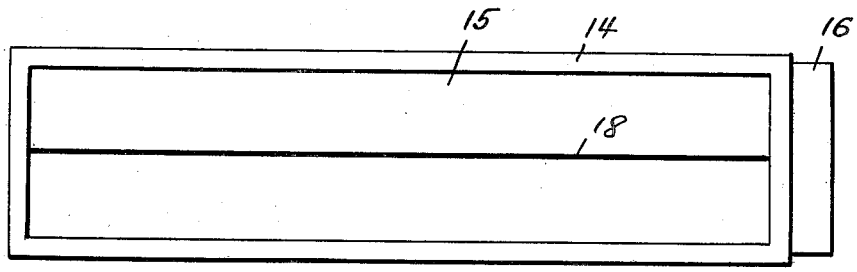
Figure 4 is a front elevational view of the case.
Figure 5:
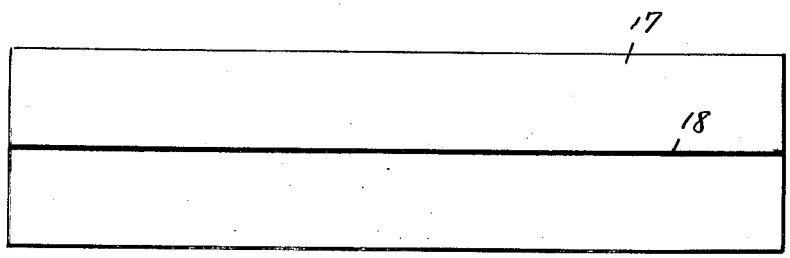
Figure 5 is a plan view of the gauge sheet.

It can now be seen, that when the assembly shown in Figures 3 and 4 is exposed with the pane 15 facing the sun, the rays of the sun will affect the strip 16 and the intensity of the result can be determined by comparing it with the unaffected portion of the strip 16 left by the line 18 on the transparent strip 17. Thus, the strip 16 can be fed outwardly from time to time until the right shade has been acquired on the strip 16 and the time of the exposure noted if desired.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A time exposure gauge comprising a casing provided with an open front, a hingedly swingable back for the gauge casing, means for securing the hinged back in closed position, a pane in the open front of the casing, a slidable sensitized sheet interposed between the back and the pane and a transparent strip having a longitudinal line thereon between the sensitized sheet and the pane and being substantially parallel to the side edges of the sheet.

LELAND A. MARKS.